United States Patent
Mo et al.

(10) Patent No.: US 10,719,985 B2
(45) Date of Patent: Jul. 21, 2020

(54) MODEL OBJECT BUILDING METHOD, SERVER, AND SYSTEM

(71) Applicant: TENCENT TECHNOLOGY (SHENZHEN) COMPANY LIMITED, Shenzhen (CN)

(72) Inventors: Xichang Mo, Shenzhen (CN); Bailin An, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/984,649

(22) Filed: May 21, 2018

(65) Prior Publication Data

US 2018/0268606 A1 Sep. 20, 2018

Related U.S. Application Data

(63) Continuation of application No. PCT/CN2017/078353, filed on Mar. 28, 2017.

(30) Foreign Application Priority Data

Mar. 29, 2016 (CN) .......................... 2016 1 0187835

(51) Int. Cl.
*G06T 17/20* (2006.01)
*G06T 19/00* (2011.01)
(Continued)

(52) U.S. Cl.
CPC ............ *G06T 17/20* (2013.01); *G06T 15/005* (2013.01); *G06T 15/08* (2013.01); *G06T 17/10* (2013.01); *G06T 19/00* (2013.01)

(58) Field of Classification Search
None
See application file for complete search history.

(56) References Cited

U.S. PATENT DOCUMENTS

| 5,503,149 A | 4/1996 | Beavin |
| 6,278,460 B1 * | 8/2001 | Myers .................. G06T 15/06 345/420 |

(Continued)

FOREIGN PATENT DOCUMENTS

| CN | 1805354 | 7/2006 |
| CN | 101354792 | 1/2009 |

(Continued)

OTHER PUBLICATIONS

International Search Report dated Jul. 4, 2017 in PCT/CN2017/078353 filed Mar. 28, 2017. (With English Translation).

(Continued)

*Primary Examiner* — Xiao M Wu
*Assistant Examiner* — Steven Z Elbinger
(74) *Attorney, Agent, or Firm* — Oblon, McClelland, Maier & Neustadt, L.L.P.

(57) ABSTRACT

A server device and a method for the server device to build a model object are described. The server device includes interface circuitry and processing circuitry. The interface circuitry is configured to receive an instruction to build a model object at the server device. The instruction is sent by a client device (e.g., user equipment) that requests services from the server device in a three-dimensional (3D) application. The client device builds the model object in a first form according to first modeling data. The processing circuitry of the server device is configured to determine, second modeling data of the model object according to the instruction, and build the model object of a second form according to the second modeling data. Then model object of the second form is used in the 3D application at the server device.

14 Claims, 6 Drawing Sheets

(51) Int. Cl.
*G06T 17/10* (2006.01)
*G06T 15/00* (2011.01)
*G06T 15/08* (2011.01)

(56) References Cited

U.S. PATENT DOCUMENTS

| | | | |
|---|---|---|---|
| 8,948,496 B2 | 2/2015 | Huffman | |
| 2007/0115282 A1* | 5/2007 | Turner | G06T 15/08 345/424 |
| 2009/0243916 A1* | 10/2009 | Beeri | G01S 7/062 342/179 |
| 2011/0142321 A1* | 6/2011 | Huffman | G06F 19/321 382/131 |
| 2014/0278292 A1* | 9/2014 | Grellou | G06F 17/5018 703/2 |
| 2016/0257077 A1* | 9/2016 | Brown | G06T 17/10 |
| 2016/0267705 A1* | 9/2016 | O'Leary | G06F 3/04815 |
| 2017/0011535 A1* | 1/2017 | Abkai | G06T 11/008 |
| 2017/0262972 A1* | 9/2017 | Adams | G06T 15/08 |

FOREIGN PATENT DOCUMENTS

| | | |
|---|---|---|
| CN | 101430792 | 5/2009 |
| CN | 101645176 | 2/2010 |
| CN | 102197649 | 9/2011 |
| CN | 102314661 | 1/2012 |
| CN | 104205083 | 12/2014 |
| JP | 2012-501029 A | 1/2012 |

OTHER PUBLICATIONS

Office Action dated Apr. 2, 2018 in Chinese Patent Application No. 201610187835.1 (With Concise English Translation).

Office Action dated Jul. 17, 2019 in Korean Patent Application No. 10-2018-7016828 (with unedited computer generated English translation).

Zhao Dong, et al., "Real-time Voxelization for Complex Polygonal Models", Proceedings of the 12th Pacific Conference on Computer Graphics and Applications, IEEE, 2004.

* cited by examiner

MODEL OBJECT BUILDING METHOD, SERVER, AND SYSTEM

RELATED APPLICATION

This application is a continuation of International Application No. PCT/CN2017/078353, filed on Mar. 28, 2017, which claims priority to Chinese Patent Application No. 201610187835.1, filed with the Chinese Patent Office on Mar. 29, 2016 and entitled "MODEL OBJECT BUILDING METHOD, SERVER, AND SYSTEM". The entire disclosures of the prior applications are hereby incorporated by reference in their entirety.

FIELD OF THE TECHNOLOGY

This application relates to the field of 3D application technologies.

BACKGROUND OF THE DISCLOSURE

With rapid development of interactive applications, the types of the interactive applications emerge. Among them, the interactive applications about building and construction are also favored by users, and application scenarios of building and construction are widely introduced into online multiplayer interactive applications.

In the related technology, the user equipment end has a high requirement on display precision, so that the user equipment end usually uses a model processing algorithm of high display precision. The server end needs to use the same model building and processing algorithm as that of the user equipment end to maintain a consistency with the user equipment end and, as a result, a calculation amount of the server is extremely large, which reduces model object building efficiency.

SUMMARY

Embodiments of this application provide a model object building method. In a model building algorithm of a server and user equipment, logic and performance are separated, so that the server may not only maintain a consistency with the user equipment on data behavior, but also store the model object in a voxel form, thereby reducing a calculation amount and improving model object building efficiency. The embodiments of this application further provide a corresponding server and system.

A server device and a method for the server device to build a model object are described. The server device includes interface circuitry and processing circuitry. The interface circuitry is configured to receive an instruction to build a model object at the server device. The instruction is sent by a client device (e.g., user equipment) that requests services from the server device in a three-dimensional (3D) application. The server device and the client device is a 3D application system. The client device builds the model object in a first form according to first modeling data. The processing circuitry of the server device is configured to determine, second modeling data of the model object according to the instruction, and build the model object of a second form according to the second modeling data. Then model object of the second form is used in the 3D application at the server device.

In some embodiments, the client device builds the model object in a polygon mesh form. The processing circuitry of the server device is configured to determine voxel modeling data of the model object according to the instruction and build the model object in a voxel form according to the voxel modeling data of the model object.

In an embodiment, respective layers for voxels in the model object are determined. Further, voxel modeling data of the respective layers is determined and combined to form the voxel modeling data of the model object. In an example, for each layer in the model object, coordinates of voxels in the layer are determined. Then, the voxel modeling data of the layer is determined according to the coordinates of the voxels in the layer of the model object.

In some embodiments, the processing circuitry is configured to determine, a block that includes an original model object for updating, from a plurality of blocks in a building model; and replace the original model object in the block with the model object in the voxel form. In other embodiments, the processing circuitry is configured to determine, a block to which the model object is to be added, from a plurality of blocks in a building model and fill space in the block with the model object in the voxel form.

Comparing with the related technology in which a server uses the same model processing algorithm as that of user equipment to build a model, resulting in a large calculation amount of the server, and low model object building efficiency, in the embodiments of this application, in a model building algorithm of the server and the user equipment, logic and performance are separated, the user equipment displaying a model object based on a form of a polygon mesh, thereby ensuring display precision, and logic of a server model building is in consistency with that of a user equipment model building, except that modeling data of the server being redisplayed in a voxel form. Although a representation form is different from that of the user equipment, the server may maintain a consistency with the user equipment on data behavior, so that a mock object of, a monster or a character, or the like, moving within a reasonable extent set in a game scenario can be effectively verified, and no unreasonable behavior such as through a wall appears. In addition, by building the model object in the voxel form, the server may reduce a calculation amount and improve model object building efficiency.

BRIEF DESCRIPTION OF THE DRAWINGS

To describe the technical solutions of the embodiments of this application more clearly, the following briefly introduces the accompanying drawings required for describing the embodiments. The accompanying drawings in the following description show only some embodiments of this application, and a person of ordinary skill in the art may still derive other drawings from these accompanying drawings.

DESCRIPTION OF EMBODIMENTS

Figure 1:
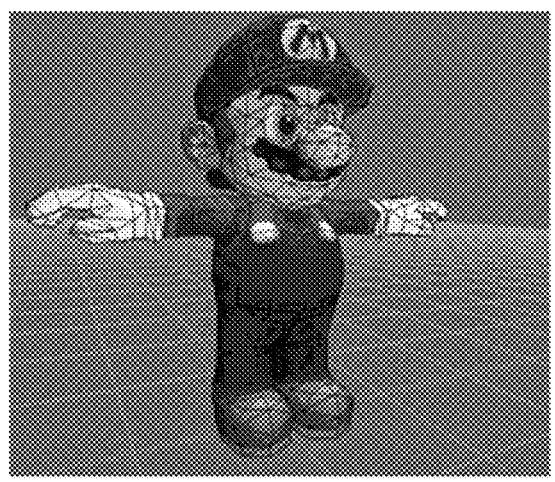
FIG. 1 is a schematic diagram of a model object based on a polygon mesh.

Embodiments of this application provide a model object building method, in which a server may build the model object by using a voxel algorithm, thereby reducing a calculation amount and improving model object building efficiency. The embodiments of this application further provide a corresponding server and system. Details descriptions are separately provided below.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person skilled in the art based on the embodiments of this application without creative efforts shall fall within the protection scope of this application.

The model object building method described in the embodiments of this application can be mostly applied to, for example, a game of building and construction class, or a massively multiplayer online role-playing game including building and construction class. In a massively multiplayer online role-playing game, a player usually needs to build a building model object, such as a fortification, so as to conduct offensive and defensive in the game. Building the model object is significantly introduced in the embodiments of this application.

In the embodiments of this application, considering a display precision on the side of user equipment, the user equipment displays a model object based on a polygon mesh algorithm. Model precision on a server end does not need to be considered too much, but a high calculating speed is required in an example, so that the server stores the model object based on a voxel algorithm. A building of the model object may be divided into two parts, a logic part and a performance part, and a building logic of the model object in the user equipment is the same as that in the server, the performance of modeling data being different. The modeling data on the side of the user equipment is polygon mesh modeling data, so that the model object finally built is displayed in a form of a polygon mesh, while the modeling data on the side of the server is voxel modeling data, so that a form of a model finally built in is a voxel form. The user equipment displays the model object in the form of the polygon mesh, and the server stores the model object in the voxel form. In this way, not only the display precision on the side of the user equipment can be ensured, but also a calculation amount on the side of the server can be reduced, and most important of all, a consistency of a height and a position in the model object building of the two ends, the user equipment and the server, is ensured. Although the display precision of the model object on the side of the server is not good, this does not affect judgment of movement reasonableness of a mock object, such as a monster or a character, in a building model object. Therefore, when the mock object moves in a building model object, the server may ensure that the mock object moves in a reasonable extent set by a game scenario according to a stored building model on the side of the server, and no unreasonable behavior such as through a wall appears.

The purpose of storing a building model object on the side of a server is to verify whether a movement of a mock object in the building model object is reasonable, and if the movement is reasonable, the server indicates a performance of a normal movement of a mock object on the side of user equipment, if the movement is unreasonable, the server skips indicating the unreasonable movement of the mock object on the side of the user equipment.

The process of building a model object on the side of user equipment and the side of a server is basically consistent, and a performance of modeling data is different. The modeling data on the side of the user equipment is polygon mesh modeling data, therefore the model object finally built is displayed in a form of a polygon mesh, and modeling data on the side of the server is voxel modeling data, therefore a form of a model finally built in is a voxel form. In the late performance stage, a presentation on the side of the user equipment is according to, for example, the form of the polygon mesh based on a 3D engine, while the storage on the side of the server is according to a voxel form.

A related solution of a polygon mesh is shown in FIG. 1, and by means of dividing a model object into innumerable small polygons, perform a modeling description on a model object. Advantages of a polygon mesh are that a division of a polygon may be extremely flexible, and a description of a model detail may be extremely precise, so that the polygon mesh is a unanimous choice of a related client 3D engine.

Figure 2:
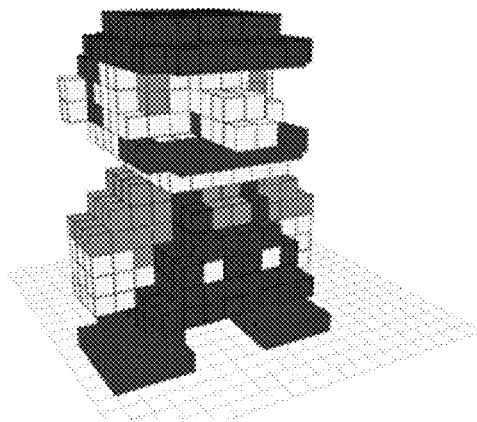
FIG. 2 is a schematic diagram of a model object based on a voxel.

As the name suggests, a voxel is a volume pixel. The voxel is a unit used to indicate a basic point in three-dimensional space. The voxel is similar to a pixel in two-dimensional surface. FIG. 2 is a voxel presentation form of a model object. As can be seen from a comparison of FIG. 2 and FIG. 1, display precision of the voxel is not as high as display precision of a polygon mesh. Advantages of a pixel solution lie in a consistency of a server and user equipment, and a relatively small data volume and calculation amount both, so that the pixel solution is applicable to being used to perform a large-scale calculation in the server end.

Figure 3:
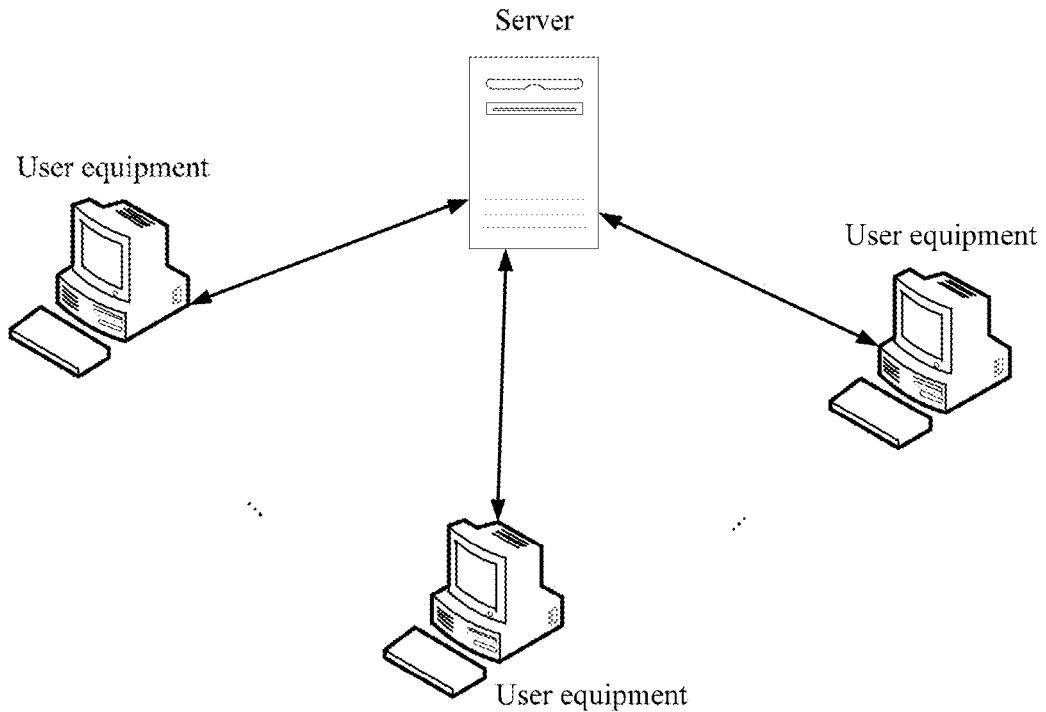
FIG. 3 is a schematic diagram of an embodiment of a 3D application system according to the embodiments of this application.
Figure 4:
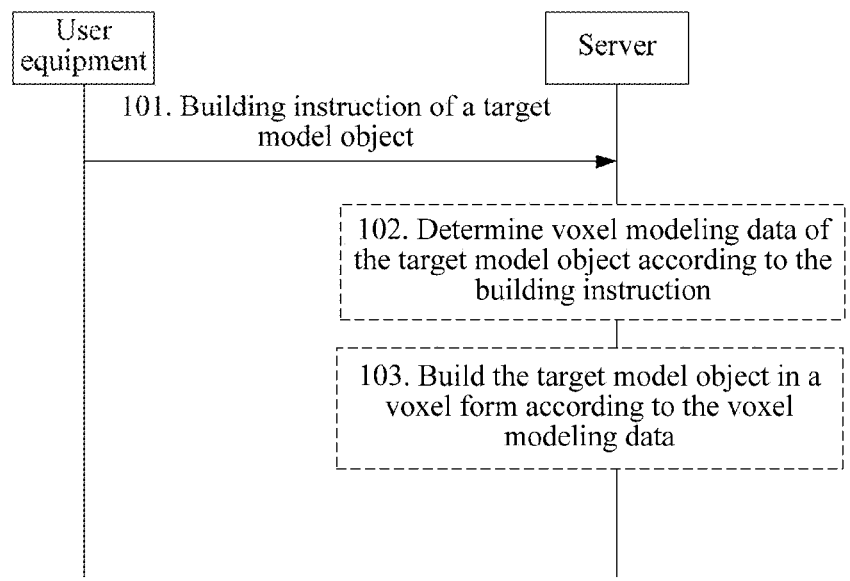
FIG. 4 is a schematic diagram of an embodiment of a model object building method according to the embodiments of this application.

FIG. 3 is a 3D application system according to the embodiments of this application. As can be seen from FIG. 3, the 3D application system including a server and user equipment, the server may be a game server; there can be multiple user equipment, not limiting to the three pieces shown in FIG. 3. When a player builds a building model on the user equipment, the user equipment determines polygon mesh modeling data of a target model object assigned by a player according to a instruction of a player, then the user equipment builds a target model object in a form of a polygon mesh according to the polygon mesh modeling data, and the user equipment displays the target model object in the form of the polygon mesh. The server receives a building instruction of the target model object sent by the user equipment, and also determines voxel modeling data of the target model object according to the building instruction; and the server builds the target model object in a voxel form according to the voxel modeling data, and then stores the target model object in the voxel form. FIG. 4 is a schematic diagram of an embodiment of a model object building method according to the embodiments of this application.

As can be seen from FIG. 4, an embodiment of a model object building method according to the embodiments of this application includes the following steps:

Step 101: A server receives a building instruction of a target model object sent by user equipment;

The target model object may be a part of a building model object, such as a roof or a wall.

Step 102: The server determines voxel modeling data of the target model object according to the building instruction; and Step 103: The server builds the target model object in a voxel form according to the voxel modeling data.

The target model object is displayed in a form of a polygon mesh on the user equipment, and the target model object is displayed in a voxel form on the server.

Comparing with the related technology that a server uses the same model processing algorithm as that of user equipment, resulting in a large calculation amount of the server, and low model object building efficiency, in this embodiment of the application, in a model building algorithm of the server and the user equipment, logic and performance are separated, the user equipment displaying a model object based on a form of a polygon mesh, thereby ensuring display precision, and logic of a server model building is in consistency with that of a user equipment model building, except that modeling data of the server being redisplayed in a voxel form. Although a representation form is different from that of the user equipment, the server may maintain a consistency with the user equipment on data behavior, so that a mock object of, a monster or a character, or the like, moving within a reasonable extent set in a game scenario can be effectively verified, and no unreasonable behavior such as through a wall appears. In addition, by building the model object in the voxel form, the server may reduce a calculation amount and improve model object building efficiency.

Considering that model objects are all dimensional, in order to improve calculation efficiency, the target model object may be layered, in this way, that the server determines voxel modeling data of the target model object according to the building instruction may include:

determining, by the server, a layer to which each voxel of the target model object belongs; and determining, by the server, voxel modeling data of each layer of voxels, and determining, by the server, the voxel modeling data of the target model object according to the voxel modeling data of each layer of voxels.

Figure 5:
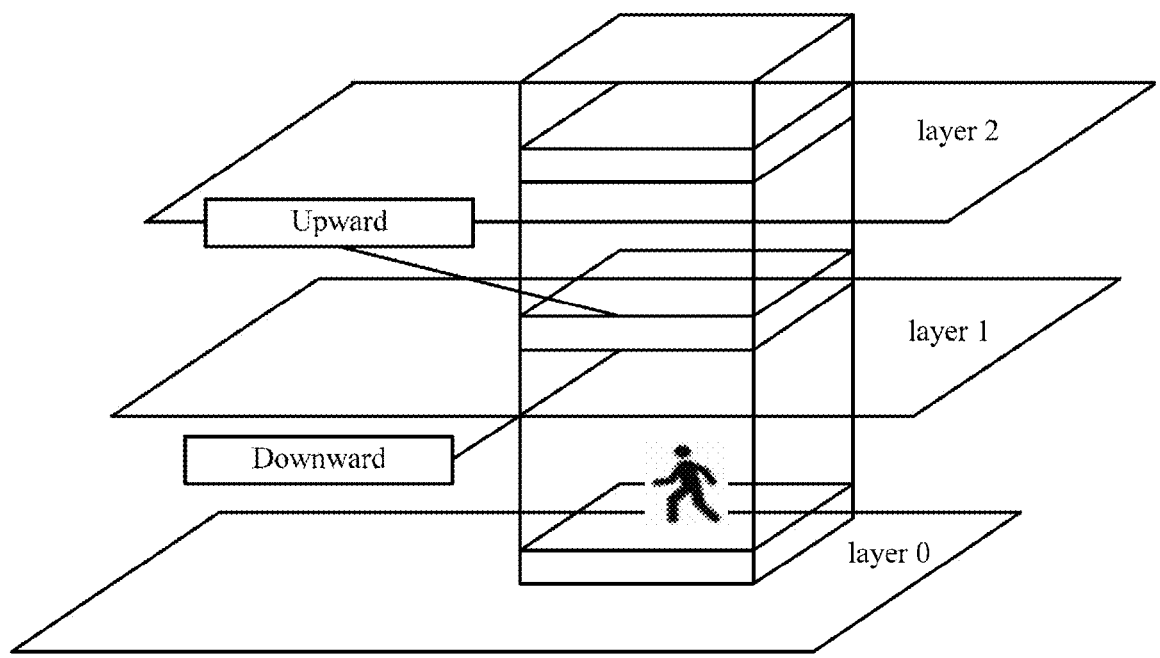
FIG. 5 is a schematic diagram of a scenario for layering a model object according to the embodiments of this application.

Understanding of layering a target model object can be referred to FIG. 5. As can be seen from FIG. 5, the target model object may be divided into several layers (layer) from top to bottom, for example, layer 0, layer 1 and layer 2 as shown in FIG. 5, and certainly not limiting to the layers shown in FIG. 5, the layers can be divided according to a requirement. Because a server end is based on a voxel, voxels of the target model object may distribute on all the layers. The voxel may be positioned in a form of coordinates on all the layers, for example, the voxel is positioned by using a (x, y, layer) triple group, and a position of a movable object in space is described by using a (x, y, z, layer) quadruple group. If a layer to which the voxel belongs is equal to 0, the layer of the voxel is a surface layer, and the voxel records an upward (upward) height, or if a layer to which the voxel belongs is greater than 0, the layer of the voxel is a building layer, and the voxel records the upward (upward) height and a downward height.

After the voxel is positioned in a form of coordinates, the determining, by the server, voxel modeling data of each layer of voxels may include:

determining, by the server, coordinates of all voxels of each layer of voxels; and determining, by the server, the voxel modeling data of each layer of voxels according to the coordinates of all the voxels.

According to the coordinates of the voxel, the determining of the voxel modeling data of the voxel may determine a position of the voxel on a map and in space. Consequently, voxel modeling data of the target model object is determined, and a position of the target model on a map and in space in a game scenario is determined.

Optionally, based on any one of the implementation solutions, a model object building method provided according to the embodiments of this application further includes:

determining, by the server, a target block of the building model object corresponding to the target model object, the building model object including multiple blocks; and after the determining, by the server, voxel modeling data of the target model object according to the building instruction, the method further includes:

replacing, by the server, an original model object corresponding to the target block with the target model object.

Figure 6:
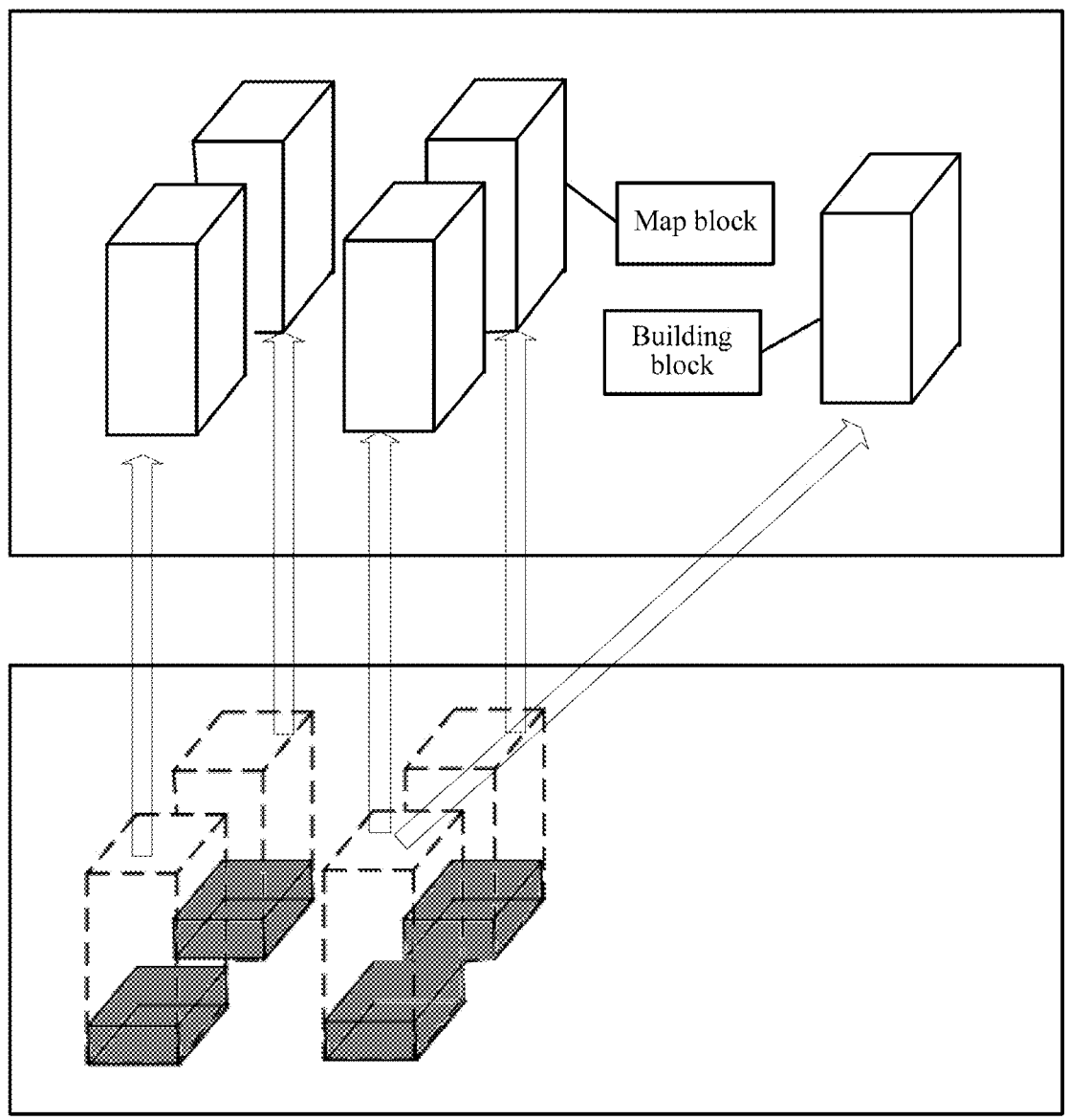
FIG. 6 is a schematic diagram of a scenario for replacing a model object in partition according to the embodiments of this application.

In the embodiments of this application, as shown in FIG. 6, a building model object may include multiple blocks, and if players want to modify a current building model object, they need to replace a part of the building model object with a new model object to build the new model object, and the new model object is a target model object in the embodiments of this application. Therefore, after determining a block corresponding to the target model object, a server may replace an original model object corresponding to the target block with the target model object, to obtain an updated building model object.

Optionally, a model object building method according to the embodiments of this application further include: the server determines the target block corresponding to the target model object in the building model object, and the building model object includes multiple blocks;

after the determining, by the server, voxel modeling data of the target model object according to the building instruction, the method further includes;

filling, by the server, space corresponding to the target block with the target model object.

In the embodiments of this application, if the target block is blank, with no original model object, the target model object may directly fill space corresponding to the target block.

During a process of building a dynamic building, a small part of data of a whole map scenario is changed, and through introducing a concept of block, make that when a system may support building a building, effect of a part of 3D scenario data is changed. An update scheme may include:

A square with a fixed side length (N) divides a whole map into multiple map blocks, building data being described with a same format.

Each map block is a projection of an N*N square on the x-y vertical area, and when a building need to be built, generate a new building block, and by integrating building data and map data, form a new terrain, then replace the map block existed on an original position of the target block with the building block. If there is no map block on the original position, directly fill the position of the target block with the new building block.

Where the determining, by the server, a target block corresponding to the building model object of the target model object may include:

determining, by the server, coordinates of the target model object;

determining, by the server, the target block corresponding to the target model object in the building model object according to the coordinates of the target model object.

In the embodiments of this application, the target block corresponding to the target model object in the building model object may be determined according to the coordinates of the target model object.

Figure 7:
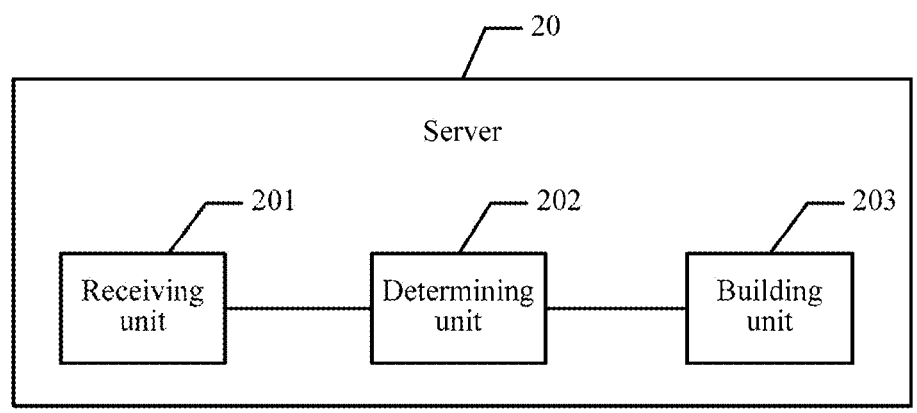
FIG. 7 is a schematic diagram of an embodiment of a server according to the embodiments of this application.

Referring to FIG. 7, a server 20 according to the embodiments of this application, being applied to a 3D application system, the 3D application system further including user equipment, the user equipment displaying a model object based on a form of a polygon mesh, the server storing the model object based on a voxel form, and an embodiment of the server 20 including:

a receiving unit 201, configured to receive a building instruction of a target model object sent by the user equipment;

a determining unit 202, configured to determine voxel modeling data of the target model object according to the building instruction received by the receiving unit 201; and a building unit 203, configured to build the target model object in the voxel form according to the voxel modeling data determined by the determining unit 202.

According to the server provided in this embodiment of the application, the receiving unit 201 receives the building instruction of the target model object sent by the user equipment; the determining unit 202 determines the voxel modeling data of the target model object according to the building instruction received by the receiving unit 201; and the building unit 203 builds the target model object in a voxel form according to the voxel modeling data determined by the determining unit 202.

Comparing with the related technology that the server uses the same model processing algorithm as that of user equipment, resulting in a large calculation amount of the server, and low model object building efficiency, in this embodiment of the application, in a model building algorithm of the server and the user equipment, logic and performance are separated, the user equipment displaying a model object based on a form of a polygon mesh, thereby ensuring display precision, and logic of a server model building is in consistency with that of a user equipment model building, except that modeling data of the server being redisplayed in a voxel form. Although a representation form is different from that of the user equipment, the server may maintain a consistency with the user equipment on data behavior, so that a mock object of, a monster or a character, or the like, moving within a reasonable extent set in a game scenario can be effectively verified, and no unreasonable behavior such as through a wall appears. In addition, by building the model object in the voxel form, the server may reduce a calculation amount and improve model object building efficiency.

Optionally, the determining unit 202 is configured to determine a layer to which each voxel of the target model object belongs; determine voxel modeling data of each layer of voxels, and determine the voxel modeling data of the target model object according to the voxel modeling data of each layer of voxels.

Optionally, the determining unit 202 is configured to determine coordinates of all the voxels of each layer of voxels; determine the voxel modeling data of each layer of voxels according to the coordinates of all the voxels.

Figure 8:
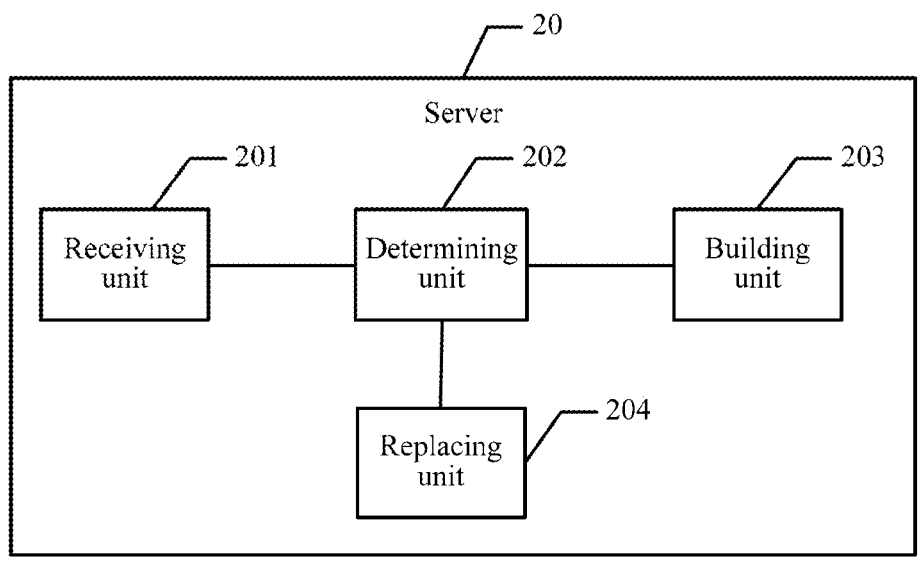
FIG. 8 is a schematic diagram of another embodiment of a server according to the embodiments of this application.

Optionally, referring to FIG. 8, another embodiment of a server provided in the embodiments of this application further includes a replacing unit 204. The determining unit 202, is further configured to determine a target block corresponding to the target model object in a building model object, in which the building model object includes multiple blocks; and the replacing unit 204, is configured to replace original voxel modeling data corresponding to the target block determined by the determining unit 202 with voxel modeling data of the target model object.

Figure 9:
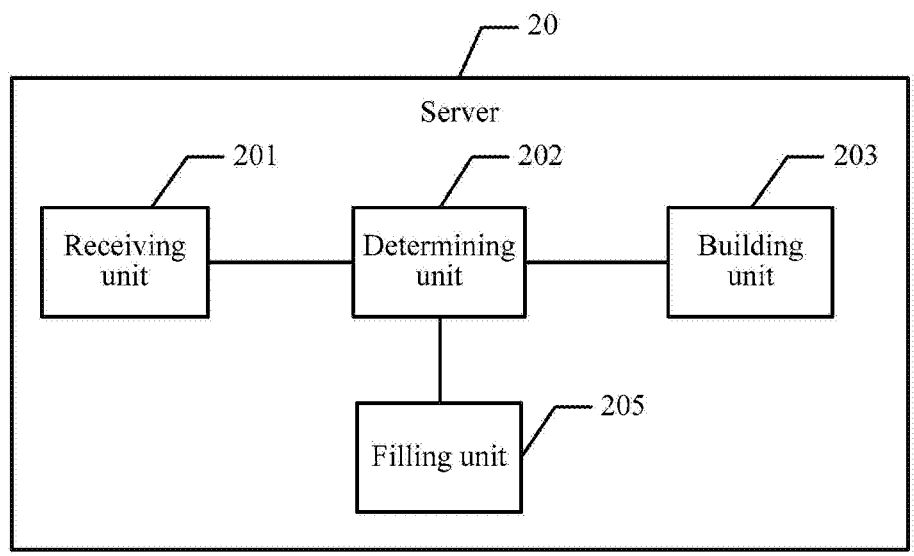
FIG. 9 is a schematic diagram of another embodiment of a server according to the embodiments of this application.

Optionally, referring to FIG. 9, another embodiment of a server provided in the embodiments of this application further includes a filling unit 205. The determining unit 202, is further configured to determine a target block corresponding to the target model object in a building model object, in which the building model object includes multiple blocks; and the filling unit 205, is configured to fill data storing space corresponding to the target block determined by the determining unit 202 with voxel modeling data of the target model object.

Optionally, based on the corresponding embodiment of FIG. 8 described above, the determining unit 202 is configured to: determine coordinates of the target model object; determine the target block corresponding to the target model object in the building model object according to the coordinates of the target model object.

Figure 10:
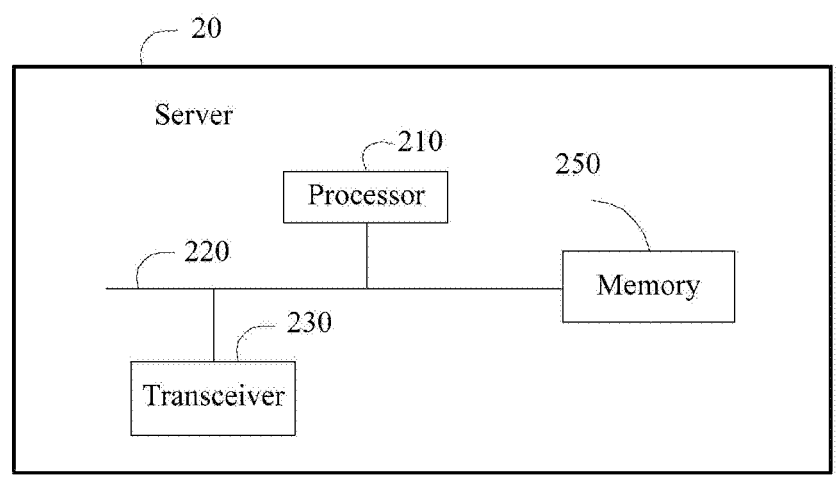
FIG. 10 is a schematic diagram of another embodiment of a server according to the embodiments of this application.

FIG. 10 is a schematic structural diagram of the server 20 provided in the embodiments of this application. The server is configured to a 3D application system, the 3D application system further including user equipment, the user equipment displaying a model object based on a form of polygon mesh, the server storing a model object based on a voxel form, the server 20 including a processor 210, a memory 250 and a transceiver 230, and the memory 250 may include a read-only memory and a random access memory, and provide an operating instruction and data to the processor 210. A part of the memory 250 may further include an NVRAM (NVRAM).

In some implementations, the memory 250 stores the following elements, an executable module, or a data structure, or a subset thereof, or an extension set thereof.

In the embodiments of this application, by calling an operating instruction stored in the memory 250 (the operating instruction may stores in the operating system), the transceiver 230 is configured to receive a building instruction of a target model object sent by the user equipment; and the processor 210 is configured to determine voxel modeling data of the target model object according to the building instruction, and build the target model object in a voxel form according to the voxel modeling data.

Comparing with the related technology in which the server uses the same model processing algorithm as that of user equipment, resulting in a large calculation amount of the server, and low model object building efficiency, in the embodiments of this application, in a model building algorithm of the server and the user equipment, logic and performance are separated, the user equipment displaying a model object based on a form of a polygon mesh, thereby ensuring display precision, and logic of a server model building is in consistency with that of a user equipment model building, except that modeling data of the server being redisplayed in a voxel form. Although a representation form is different from that of the user equipment, the server may maintain a consistency with the user equipment on data behavior, so that a mock object of, a monster or a character, or the like, moving within a reasonable extent set in a game scenario can be effectively verified, and no unreasonable behavior such as through a wall appears. In addition, by building the model object in the voxel form, the server may reduce a calculation amount and improve model object building efficiency.

The processor 210 controls an operation of the server 20, and the processor 210 may also be referred to as a CPU (Central Processing Unit, central processing unit). The memory 250 may include a read-only memory and a random access memory, and provides an instruction and data to the processor 210. A part of the memory 250 may further include an NVRAM (NVRAM). In a specific application, all components of the server 20 are coupled by using a bus system 220, and in addition to a data bus, the bus system 220 may further include a power source bus, a control bus, a state signal bus, and the like. But, for ease of clear description, all types of buses in the diagram are marked as the bus system 220.

The method disclosed in the foregoing embodiments of the application may be applied to the processor 210, or in other words, may be implemented by the processor 210. The processor 210 may be an integrated circuit chip and has a signal processing capability. In an implementation process, steps in the foregoing methods may be implemented through a hardware integrated logical circuit in the processor 210, or an instruction in the form of software. The processor 210 may be a general-purpose processor, a DSP, an ASIC, an FPGA, another programmable logic component, a discrete gate or a transistor logic device, and a discrete hardware component, and may implement or execute methods, steps, and logical block diagrams disclosed in the embodiments of this application. The general-purpose processor may be a micro-processor, or the processor may also be any conventional processor or the like. The steps in the methods disclosed in the embodiments of this application may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the memory 250, and the processor 210 reads information in the memory 250 and performs the steps of the foregoing methods in combination with hardware of the processor.

Optionally, the determining unit 210 is configured to determine a layer to which each voxel of the target model object belongs; determine voxel modeling data of each layer of voxels, and determine voxel modeling data of the target model object according to the voxel modeling data of each layer of voxels.

Optionally, the determining unit 210 is configured to determine coordinates of all the voxels of each layer of voxels; and determine the voxel modeling data of each layer of voxels according to the coordinates of all the voxels.

Optionally, the processor 210 is further configured to determine a target block corresponding to the target model object in a building model object, the building model object including multiple blocks; and replace an original model object corresponding to the target block with the target model object.

Optionally, the processor 210 is further configured to determine a target block corresponding to the target model object in a building model object, the building model object including multiple blocks; and fill space corresponding to the target block with the target model object.

Optionally, the processor 210 is configured to determine coordinates of the target model object, and determine a target block corresponding to the target model object in a building model object according to the coordinates of the target model object.

For understanding of the server 20 described above, refer to related description in FIG. 1 to FIG. 6, and excessive details are not described herein.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

A person skilled in the art may understand that, the user equipment referred to FIG. 10 may also include a processor, a memory, a transceiver, and a system bus, so as to present a model object based on a form of a polygon mesh.

A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, an optical disc, or other non-transitory computer-readable mediums.

The model object building method, server, and system provided in the embodiments of this application are described above in detail. Although the principles and implementation manners of this application are described by using specific embodiments in this specification, the foregoing descriptions of the embodiments are intended to help understand the method and core idea of the method of this application. Meanwhile, a person of ordinary skill in the art may make modifications to the specific implementation manners and application range according to the idea of this application. In conclusion, the content of the specification should not be construed as a limitation to this application.

What is claimed is:

1. A method for model building at a server device, the method comprising:
   receiving, by interface circuitry of the server device, an instruction to build a model object at the server device, the instruction being sent by a client device that requests services from the server device in a three-dimensional (3D) application, and builds the model object in a first form according to first modeling data;
   determining, by processing circuitry of the server device, second modeling data of the model object by:
      dividing the model object into different layers,
      distributing voxels of the model object on all the different layers, some of the voxels representing non-movable objects being described by triple groups, and some other of the voxels representing movable objects being described by quadruple groups;
      determining voxel modeling data of the different layers according to the instruction, and
      combining the voxel modeling data of the different layers to form voxel modeling data of the model object; and
   building, by the processing circuitry of the server device, the model object in a second form according to the second modeling data for use at the server device.

2. The method according to claim 1, wherein the building the model object in the second form according to the second modeling data for use at the server device further comprises:
   building the model object in a voxel form according to the voxel modeling data of the model object, the client device building the model object in a polygon mesh form.

3. The method according to claim 2, further comprising:
determining, by the processing circuitry of the server device, a block that includes an original model object for updating, from a plurality of blocks in a building model; and
replacing, by the processing circuitry of the server device, the original model object in the block with the model object in the voxel form.

4. The method according to claim 2, further comprising:
determining, by the processing circuitry of the server device, a block to which the model object is to be added, from a plurality of blocks in a building model; and
filling, by the processing circuitry of the server, space in the block with the model object in the voxel form.

5. The method according to claim 1, wherein the determining, by the processing circuitry of the server device, the voxel modeling data of the different layers comprises:
determining, by the processing circuitry of the server device, coordinates of voxels in one of the different layers of the model object; and
determining, by the processing circuitry of the server device, the voxel modeling data of the one of the different layers according to the coordinates of the voxels in the one of the different layers of the model object.

6. The method according to claim 5, further comprising:
determining, by the processing circuitry of the server device, a block that includes an original model object for updating, from a plurality of blocks in a building model; and
replacing, by the processing circuitry of the server device, the original model object in the block with the model object in the voxel form.

7. The method according to claim 5, further comprising:
determining, by the processing circuitry of the server device, a block to which the model object is to be added, from a plurality of blocks in a building model; and
filling, by the processing circuitry of the server, space in the block with the model object in the voxel form.

8. A server device, comprising:
interface circuitry configured to receive an instruction to build a model object at the server device, the instruction being sent by a client device that requests services from the server device in a three-dimensional (3D) application, and builds the model object in a first form according to first modeling data; and
processing circuitry configured to:
divide the model object into different layers,
distribute voxels of the model object on all the different layers, some of the voxels representing non-movable objects being described by triple groups, and some other of the voxels representing movable objects being described by quadruple groups;
determine voxel modeling data of the different layers according to the instruction;
combine the voxel modeling data of the different layers to form voxel modeling data of the model object;
determine, second modeling data of the model object according to the voxel modeling data of the model object;
build the model object in a second form according to the second modeling data; and
use the model object of the second form in the 3D application at the server device.

9. The server device according to claim 8, wherein the client device builds the model object in a polygon mesh form, and the processing circuitry of the server device is configured to:
build the model object in a voxel form according to the voxel modeling data of the model object.

10. The server device according to claim 9, wherein the processing circuitry is configured to:
determine coordinates of voxels in one of the different layers of the model object; and
determine the voxel modeling data of the one of the different layers according to the coordinates of the voxels in the one of the different layers of the model object.

11. The server device according to claim 10, wherein the processing circuitry is configured to:
determine a block that includes an original model object for updating, from a plurality of blocks in a building model; and
replace the original model object in the block with the model object in the voxel form.

12. The server device according to claim 10, further comprising:
determine, a block to which the model object is to be added, from a plurality of blocks in a building model; and
fill space in the block with the model object in the voxel form.

13. The server device according to claim 9, wherein the processing circuitry is configured to:
determine, a block that includes an original model object for updating, from a plurality of blocks in a building model; and
replace the original model object in the block with the model object in the voxel form.

14. The server device according to claim 9, further comprising:
determine, a block to which the model object is to be added, from a plurality of blocks in a building model; and
fill space in the block with the model object in the voxel form.

* * * * *